(12) United States Patent
Koetter et al.

(10) Patent No.: US 9,767,974 B2
(45) Date of Patent: Sep. 19, 2017

(54) SHORT-CIRCUIT SHUTDOWN SWITCH

(71) Applicant: Tyco Electronics AMP GmbH, Bensheim (DE)

(72) Inventors: Albert Koetter, Berlin (DE); Titus Ziegler, Berlin (DE); Thomas Hahnel, Berlin (DE); Rene Wagner, Berlin (DE); Uwe Kramer, Schulzendorf (DE); Christian Maranke, Luechfeld (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 14/667,936

(22) Filed: Mar. 25, 2015

(65) Prior Publication Data

US 2015/0200065 A1 Jul. 16, 2015

Related U.S. Application Data (63) Continuation of application No. PCT/EP2013/069834, filed on Sep. 24, 2013.

(30) Foreign Application Priority Data

Sep. 25, 2012 (DE) .................. 10 2012 217 251
Nov. 27, 2012 (DE) .................. 10 2012 221 664

(51) Int. Cl.
*H01H 33/06* (2006.01)
*H01H 39/00* (2006.01)
(Continued)

(52) U.S. Cl.
CPC .......... *H01H 33/06* (2013.01); *H01H 33/182* (2013.01); *H01H 39/006* (2013.01);
(Continued)

(58) Field of Classification Search
CPC .... H01H 33/06; H01H 33/183; H01H 39/006; H01H 85/0039; H01H 2003/0286; H01H 2039/008; B23D 15/12; B23D 15/145
(Continued)

(56) References Cited

U.S. PATENT DOCUMENTS 2,861,153 A 11/1958 Erk et al.
3,915,236 A 10/1975 Stichling
(Continued)

OTHER PUBLICATIONS

PCT Notification of Transmittal of the International Search Report and the Written Opinion of the International Searching Authority, or the Declaration, International Application No. PCT/EP2013/069834, dated Feb. 19, 2014, 1 page.
(Continued)

*Primary Examiner* — Anatoly Vortman
*Assistant Examiner* — Jacob Crum
(74) *Attorney, Agent, or Firm* — Barley Snyder (57) ABSTRACT

A short-circuit shutdown switch is disclosed having a load current path and a cutting plunger. The load current path has a separating member with a first predetermined cutting zone, a second predetermined cutting zone, and a central section positioned between the first predetermined cutting zone and the second predetermined cutting zone. The cutting plunger is positioned to cut the first predetermined cutting zone and the second predetermined cutting zone.

21 Claims, 10 Drawing Sheets

(51) Int. Cl.
    *H01H 33/18*     (2006.01)
    *H01H 85/00*     (2006.01)
    *H01H 3/02*     (2006.01)
    *B23D 15/14*     (2006.01)
    *B23D 15/12*     (2006.01)

(52) U.S. Cl.
    CPC ......... *H01H 85/0039* (2013.01); *B23D 15/12* (2013.01); *B23D 15/145* (2013.01); *H01H 2003/0286* (2013.01); *H01H 2039/008* (2013.01)

(58) Field of Classification Search
    USPC .................. 337/157; 83/622, 636, 639.7
    See application file for complete search history.

(56) References Cited

U.S. PATENT DOCUMENTS

| | | | | |
|---|---|---|---|---|
| 4,654,620 | A * | 3/1987 | Rooney | H01H 85/10 337/159 |
| 5,535,842 | A * | 7/1996 | Richter | B60K 28/14 180/271 |
| 5,770,994 | A * | 6/1998 | Evans | H01H 85/10 337/159 |
| 6,556,119 | B1 | 4/2003 | Lell | |
| 7,498,531 | B2 * | 3/2009 | Knauss | H01H 39/006 200/61.08 |
| 8,653,386 | B2 | 2/2014 | Ukon et al. | |
| 2004/0221638 | A1 * | 11/2004 | Brede | B23D 15/145 72/326 |
| 2005/0073387 | A1 | 4/2005 | Kordel et al. | |
| 2006/0145808 | A1 * | 7/2006 | Von Behr | H01H 39/006 337/401 |
| 2010/0218659 | A1 * | 9/2010 | Ukon | H01H 39/006 83/639.1 |
| 2010/0328014 | A1 * | 12/2010 | Suzuki | H01H 9/12 337/30 |
| 2012/0194954 | A1 | 8/2012 | Fukuyama et al. | |

OTHER PUBLICATIONS

PCT International Search Report and Written Opinion of the International Searching Authority, International Application No. PCT/EP2013/069834, dated Feb. 19, 2014, 9 pages.

English translation of Chinese First Office Action, dated Jul. 6, 2016, 13 pages.

\* cited by examiner

SHORT-CIRCUIT SHUTDOWN SWITCH

CROSS-REFERENCE TO RELATED APPLICATIONS

This application claims priority under 35 U.S.C. §119(a)-(d) or (f) to International Patent Application No. PCT/EP2013/069834, filed Sep. 24, 2013.

FIELD OF THE INVENTION

The invention is generally related to a short-circuit shutdown switch, and, more specifically, to a short-circuit shutdown switch having a predetermined cutting zone.

BACKGROUND

Short-circuit shutdown switches are designed to break electric circuits in the event of a short circuit. Conventional electromechanical short-circuit shutdown switches having a bridging contact are known, as is also known from relays and contactors. Such conventional short-circuit shutdown switches have the disadvantage that an expensive contact set must be available for a short circuit to be switched off only once. Moreover, a large amount of contact force is often required due to the two pairs of bridging contacts being positioned in series, and the resultant contact resistance with which the contacts must be held together over the whole lifetime of the short-circuit shutdown switch in order to keep the resistance low. A further disadvantage is that shock and vibration loads can reduce the contact forces temporarily, resulting in situations where the contacts can weld together at high currents.

Other short-circuit shutdown switches include conventional pyrotechnical battery shutdown switches having cutting elements, where a wedge triggered by an explosion, cuts through an electric cable. As a result of the high potential explosive energy, the cutting wedge can also cut through solid cable cross sections mechanically. Such battery shutdown switches are, however, associated with high costs, and rely on an explosion mechanism, which has multiple components, thus increasing a possibility of failure.

Consequently, there is a need for a short-circuit shutdown switch that avoids the above disadvantages.

SUMMARY

A short-circuit shutdown switch has a load current path and a cutting plunger. The load current path has a separating member with a first predetermined cutting zone, a second predetermined cutting zone, and a central section positioned between the first predetermined cutting zone and the second predetermined cutting zone. The cutting plunger is positioned to cut the first predetermined cutting zone and the second predetermined cutting zone.

BRIEF DESCRIPTION OF THE DRAWINGS

The invention will now be described by way of example, with reference to the accompanying drawings, of which.

DETAILED DESCRIPTION OF THE EMBODIMENT(S)

The invention will now be described with reference to FIGS. 1-16.

Figure 1:
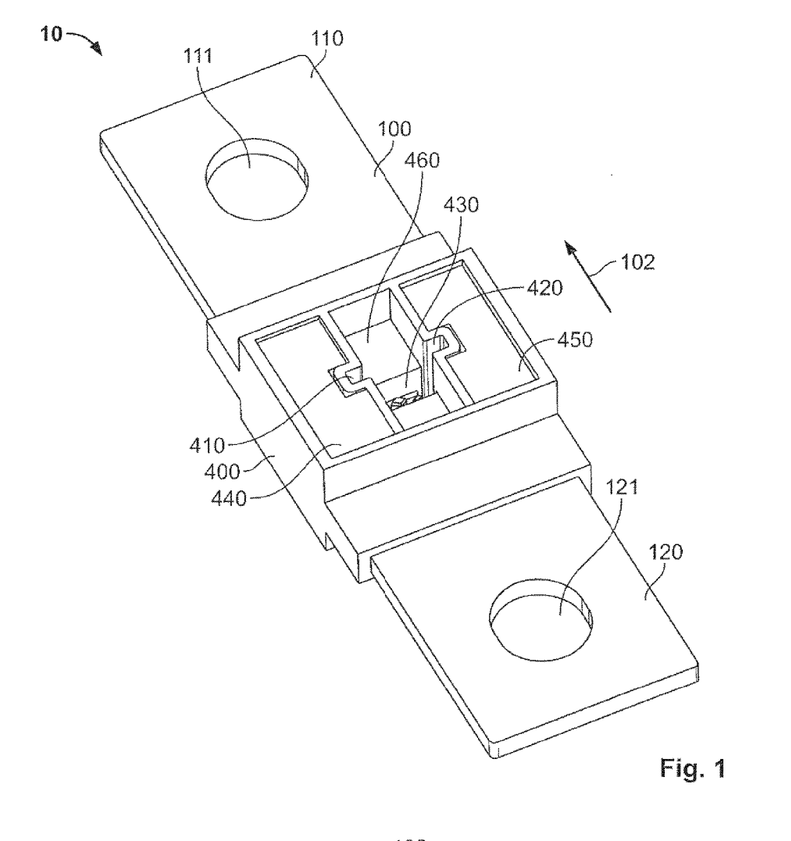
FIG. 1 is a perspective view a component of a short-circuit shutdown switch.

In an embodiment shown in FIG. 1, a short-circuit shutdown switch 10 serves to open an electric circuit in the event of a short circuit. The electric circuit may be for high voltages and high electric currents. The short-circuit shutdown switch 10 can, for example, be used in electric or hybrid vehicles.

The short-circuit shutdown switch 10 has a housing 400, a portion of with is shown in FIG. 1. The housing 400 is made from plastic or other suitable dielectric materials. A load current path 100 carries an electric current in a current flow direction 102 running through the housing 400. The current can, of course, also flow in the load current path 100 in the opposite direction to the current flow direction 102 shown.

Figure 2:
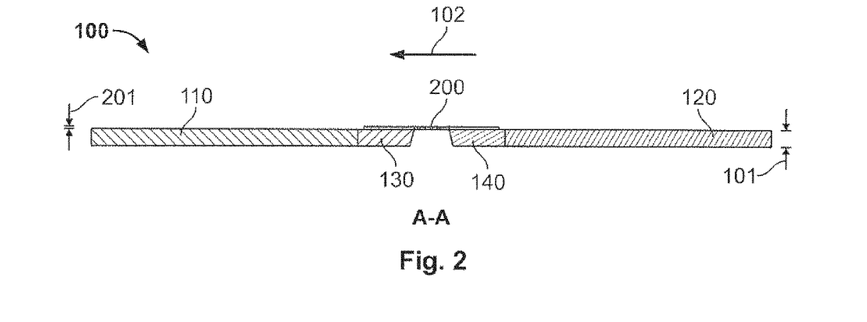
FIG. 2 is a cross-sectional view of a load current path of the short-circuit shutdown switch.
Figure 3:
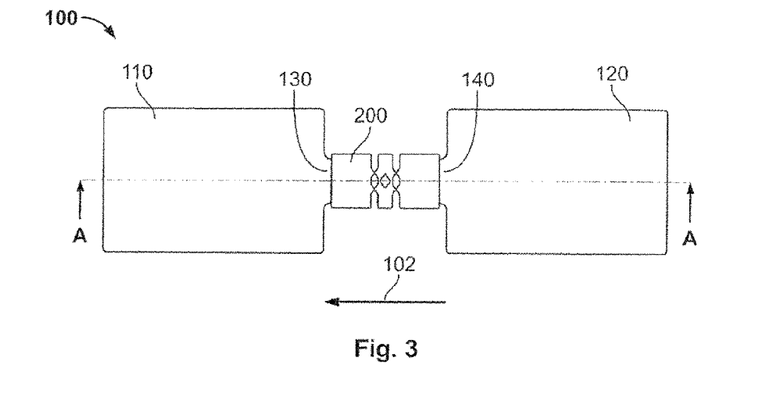
FIG. 3 is a plan view of the load current path.
Figure 4:
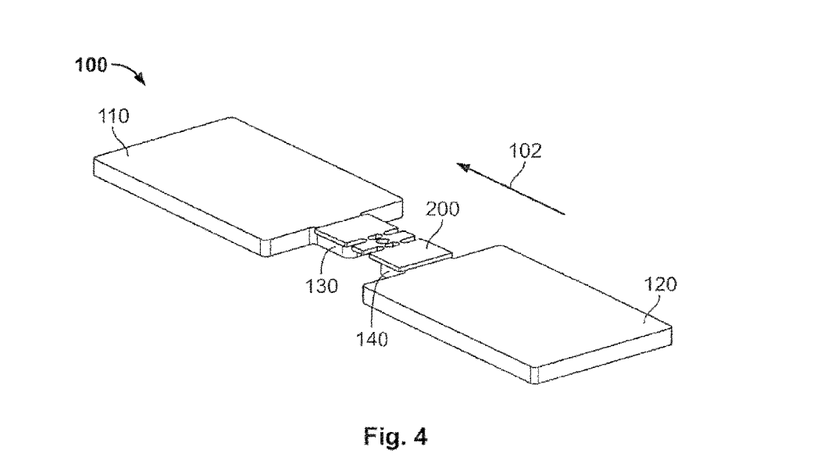
FIG. 4 is a perspective view of the load current path.

In the embodiments shown in FIGS. 2-4, the load current path 100 includes a first conducting member 110 and a second conducting member 120. The first conducting member 110 and the second conducting member 120 are substantially flat plates, each having a first width (not labeled), a first thickness 101, and being made of a material having good electric conductivity. The first thickness 101, as well as a width of the conducting members 110, 120, is selected to be such a size that the conducting members 110, 120 have a large cross section and low electrical resistance.

The first conducting member 110 and the second conducting member 120 are positioned one behind the other in the current flow direction 102 along the load current path 100. On a second member facing side, a side facing the second conducting member 120, the first conducting member 110 has a first connection section 130. On a first member facing side, a side facing the first conducting member 110, the second conducting member 120 has a second connection section 140. In an embodiment, the first connection section 130 and the second connection section 140 have a reduced width compared to the rest of the conducting members 110, 120. In another embodiment, the first connection section 130 and the second connection section 140 have the same width as the rest of the conducting members 110,120.

The load current path 100 also has a separating member 200. The separating member 200 is connected to the first connection section 130 of the first conducting member 110 and the second connection section 140 of the second conducting member 120 to form an electrically conductive bridge there between. Consequently, the first conducting member 110 of the load current path 100 is electrically connected via the separating member 200 to the second conducting member 120.

The separating member 200 is a thin plate with a second thickness 201 and consists of a material with good electric conductivity. The second thickness 201 is smaller than the first thickness 101 of the conducting members 110, 120. The width of the separating member 200, perpendicular to the current flow direction 102, is approximately equivalent to the width of the connection sections 130, 140 of the conducting members 110, 120. Thus the separating member 200 has a considerably smaller cross section perpendicular to the current flow direction 102 than the conducting members 110, 120. See for example, the embodiments shown in FIGS. 3 and 4.

Figure 17:
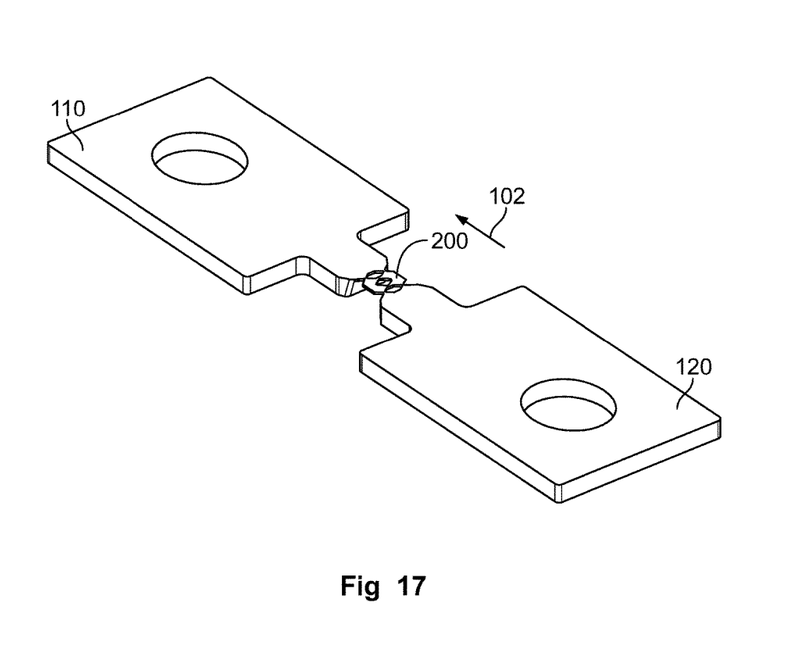
FIG. 17 is a perspective view of a load current path of the short-circuit shutdown switch.

In an embodiment, as shown in FIGS. 2, 3, and 4, the first conducting member 110, the separating member 200 and the second conducting member 120 can be constructed as separate parts, and be connected together in the region of the connection sections 130, 140 such that all three members 110,200,120 are electrically conductive. In another embodiment shown in FIG. 17, the separating member 200 is integrally constructed as a single part with the first conducting member 110 and the second conducting member 120 of the load current path 100.

Figure 5:
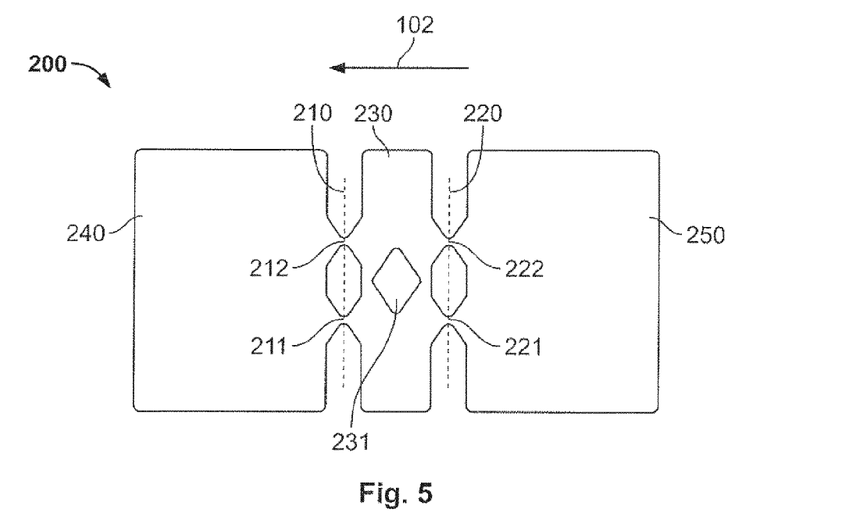
FIG. 5 is a plan view of a separating member of the load current path of the short-circuit shutdown switch.

As shown in the embodiment of FIG. 5, the separating member 200 has a first conducting tab 240, a central section 230 and a second conducting tab 250, which are positioned one behind the other in the current flow direction 102. The first conducting tab 240 is connected to the central section 230 via a first predetermined cutting zone 210. The second conducting tab 250 is connected to the central section 230 via a second predetermined cutting zone 220. The first predetermined cutting zone 210 is on an opposite side of the central section 230 than the second predetermined cutting zone 220.

The first predetermined cutting zone 210 has a first separating web 211 and a third separating web 212. The second predetermined cutting zone 220 has a second separating web 221 and a fourth separating web 222. The first separating web 211 and the third separating web 212 are positioned next to one another transverse to the current flow direction 102. Accordingly, the second separating web 221 and the fourth separating web 222 are also positioned next to one another transverse to the current flow direction 102.

Transverse to the current flow direction 102, the separating webs 211, 212, 221, 222 have a very greatly reduced width in comparison to the width of the rest of the separating member 200. Thus the separating member 200 has a narrowed cross section in the region of the predetermined cutting zones 210, 220 perpendicular to the current flow direction 102.

In the current flow direction 102, the separating webs 211, 212, 221, 222 are constructed such that they are as short in length as possible along the current flow direction 102 in order to keep the electrical resistance of the first predetermined cutting zone 210 and the second predetermined cutting zone 220 as low as possible. The separating member 200, as a whole, is constructed such that it has a length that is as short as possible between the first conducting member 110 and the second conducting member 120 in the current flow direction 102. The short length keeps the electrical resistance of the separating member 200 as low as possible.

The central section 230 of the separating member 200, positioned between the first predetermined cutting zone 211 and the second predetermined cutting zone 212, has a pin receiving hole 231 having a rhombus-shaped cross section, as shown in the embodiment of FIG. 5.

Figure 6:
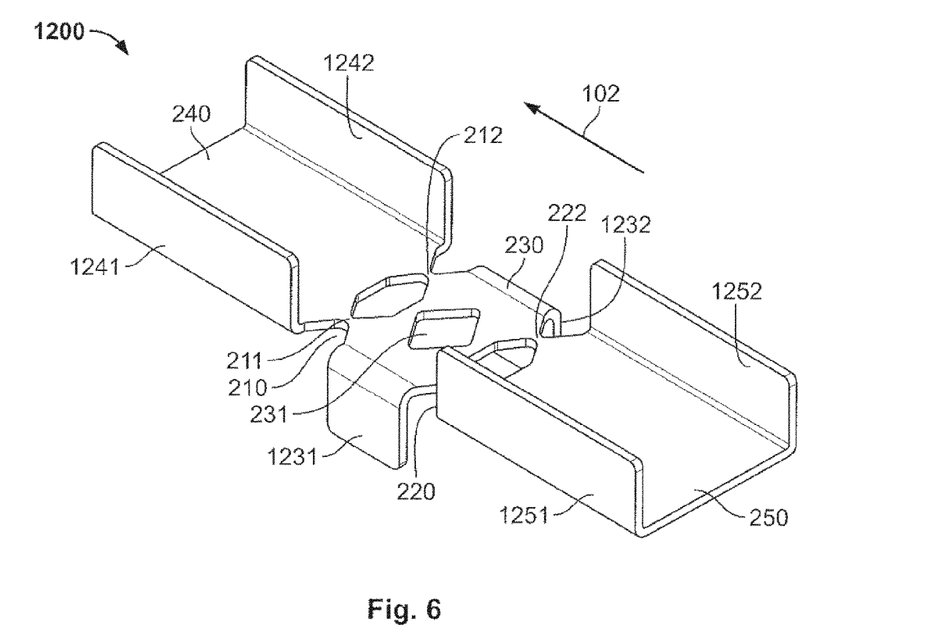
FIG. 6 shows a perspective view of the separating member.

In an embodiment shown in FIG. 6, the separating member 1200 has many similar elements with those of the separating member 200. Similar elements are provided with the same reference numerals and are not described in more detail again hereinafter. In an embodiment, the separating member 1200 is a separate component from the conducting members 110, 120.

A first upper blade 1241 and a second upper blade 1242 are positioned on the first conducting tab 240 of the separating member 1200. The upper blades 1241, 1242 are positioned on outer edges of the first conducting tab 240 orientated parallel to the current flow direction 102 and are angled at approximately 90° to the first conducting tab 240. Similarly, a third upper blade 1251 and a fourth upper blade 1252 are positioned on the second conducting tab 250 of the separating member 1200. A first lower blade 1231 and a second lower blade 1232 are positioned on outer edges, orientated in the current flow direction 102, of the central section 230 of the separating member 1200 and are angled at approximately 90° to the central section 230. The lower blades 1231, 1232 extend here in an opposite spatial direction to the upper blades 1241, 1242, 1251, 1252. The orientation of the blades 1231, 1232, 1241, 1242, 1251, 1252 could, however, also be different. In particular, the blades 1231, 1232, 1241, 1242, 1251, 1252 could also be angled at an angle other than a right angle or folded at approximately 180°. Further, in an embodiment, the upper blades 1241, 1242,1251,1252 extend outwardly from the first and second conducting tabs 240,250 in the same direction.

If the separating member 1200 carries a load current in the current flow direction 102 then heat is generated in the regions of the predetermined cutting zones 210, 220 due to the comparatively high electrical resistance of the separating webs 211, 212, 221, 222. This heat can be dissipated via the surface of the separating member 200 enlarged by the blades 1231, 1232, 1241, 1242, 1251, 1252. In other embodiments, one or more of the blades 1231, 1232, 1241, 1242, 1251, 1252 may be omitted, depending on the heat generated by the application.

Figure 7:
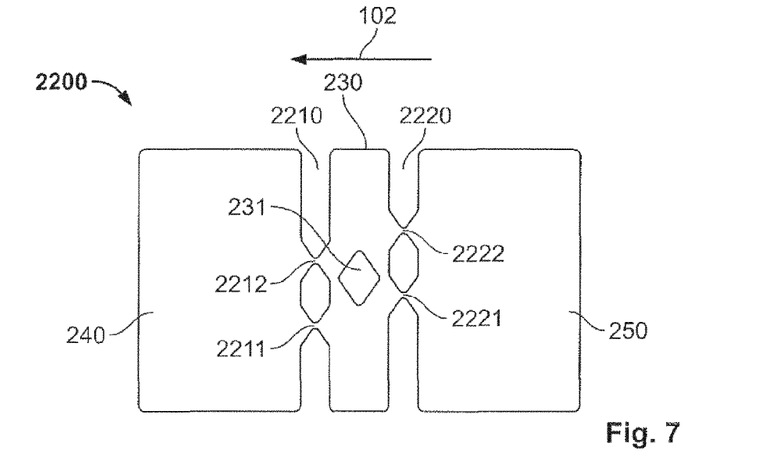
FIG. 7 is a plan view of a separating member of the load current path of the short-circuit shutdown switch.

In an embodiment shown in FIG. 7, a separating member 2200 also has many similar elements with those of the separating member 200. Similar elements are again provided with the same reference numerals.

In the case of separating member 2200, the first conducting tab 240 is connected to the central section 230 via a first predetermined cutting zone 2210. The second conducting tab 250 is connected to the central section 230 via a second predetermined cutting zone 2220. The first predetermined cutting zone 2210 has a first separating web 2211 and a third separating web 2312. The second predetermined cutting zone 2220 has a second separating web 2221 and a fourth separating web 2222. The configuration of the separating webs 2211, 2212, 2221, 2222 itself corresponds to that of the separating webs 211, 212, 221, 222 of separating member 200. The first separating web 2211 and the third separating web 2212 of the first predetermined cutting zone 2210 are positioned next to each other transverse to the current flow direction 102, as are the second separating web 2221 and the fourth separating web 2222 of the second predetermined cutting zone 2220.

However, in contrast to separating member 200, the first separating web 2211 and the second separating web 2221 are also staggered in relation to each other transverse to the current flow direction 102, as are the third separating web 2212 and the fourth separating web 2222. The separating member 2200 therefore, there follows one after the other in a direction perpendicular to the current flow direction 102 the first separating web 2211 of the first predetermined cutting zone 2210, the second separating web 2221 of the second predetermined cutting zone 2220, the third separating web 2212 of the first predetermined cutting zone 2210 and the fourth separating web 2222 of the second predetermined cutting zone 2220. This arrangement has the advantage that the separating webs 2211, 2212, 2221, 2222 can be cut through successively so that only one separating web 2211, 2212, 2221, 2222 is ever being cut through at any one time. This becomes even clearer in connection with the following description.

Figure 8:
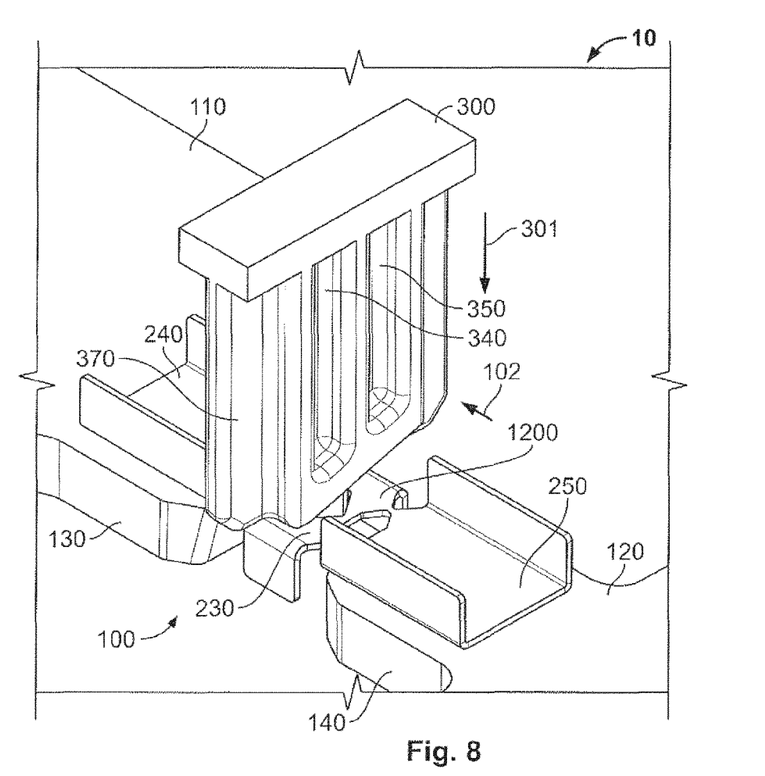
FIG. 8 is a perspective view of the short-circuit shutdown switch with a cutting plunger.

In an embodiment shown in FIG. 8, the separating member 1200 is positioned in the load current path 100 between the first connection section 130 of the first conducting member 110 and the second connection section 140 of the second conducting member 120. The separating member 200, or alternatively, the separating member 2200 could, however, also be provided.

The embodiment of FIG. 8 also shows a cutting plunger 300 of the short-circuit shutdown switch 10 in a resting position. The cutting plunger 300 is positioned in a direction perpendicular to the current flow direction 102, above the central section 230 of the separating member 1200. The cutting plunger 300 serves to cut through the first predetermined cutting zone 210 and the second predetermined cutting zone 220 of the separating member 1200 in the event of a short circuit, in order to interrupt an electric current flowing in the load current path 100. The cutting plunger 300 may, for example, be plastic or another suitable dielectric material, and may be produced as a low-cost injection moulded part.

Figure 9:
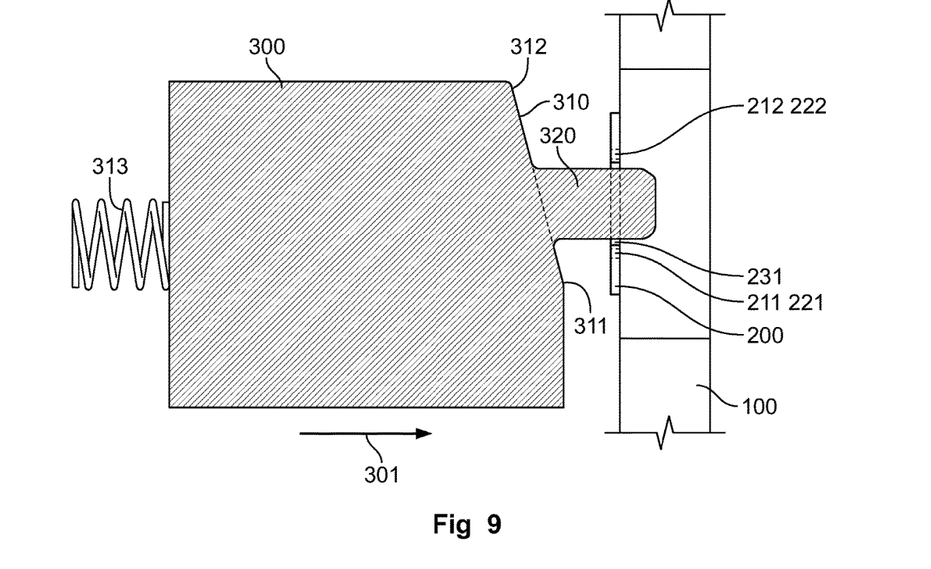
FIG. 9 is a cross-sectional view of the cutting plunger in a first position.

The embodiment of FIG. 9 shows the cutting plunger 300 in the resting position where the cross-section runs perpendicular to the current flow direction 102. In the resting position, the cutting plunger 300 is not engaged with the separating member 200, 1200, being spaced a distance therefrom. In the resting position, the cutting plunger 300 may, for example, be pre-stressed over a spring element 313. In the event of a short circuit, the cutting plunger 300 is triggered. The spring element 313 then accelerates the cutting plunger 300 in a cutting direction 301 towards the separating member 200, 1200 in order to cut through the predetermined cutting zones 210, 220. The energy required to cut through the predetermined cutting zones 210, 220 is thus stored in the spring element 313 in the resting position of the cutting plunger 300 in this embodiment. One of ordinary skill in the art would appreciate that in other embodiments, a mechanical tensioning device of the short-circuit shutdown switch 10 can, however, also be constructed differently.

The cutting plunger 300 has a plunger surface 310 facing the separating member 200, 1200. The plunger surface 310 is chamfered at an angle of approximately 30° with respect to a plane through the separating member 200, 1200. Thus the plunger surface 310 has a front end 311, which is located proximate to the separating member 200, 1200 than a distal back end 312 of the plunger surface 310 when the cutting plunger 300 is in the resting position. The front end 311 of the plunger surface 310 here is positioned proximate to the first separating web 211 and the second separating web 221. The back end 312 of the plunger surface 310 is positioned proximate to the third separating web 212 and the fourth separating web 222.

Figure 10:
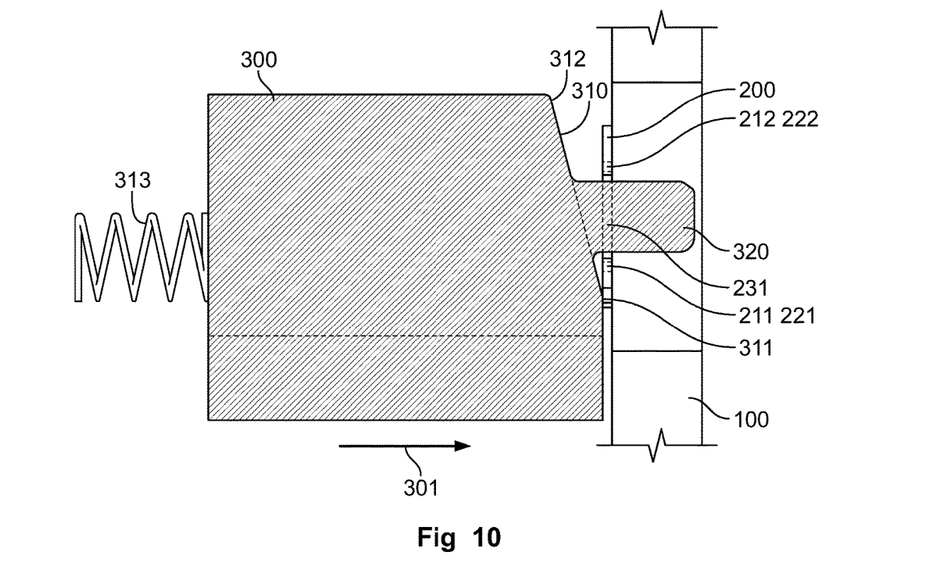
FIG. 10 is a cross-sectional view of the cutting plunger in a second position cutting through predetermined cutting zones.

The embodiment of FIG. 10 shows the cutting plunger 300 moved out of the resting position in a cutting direction 301, towards the separating member 200, 1200. The chamfer of the plunger surface 310 causes the front end 311 of the plunger surface 310 to already be in contact with the central section 230 of the separating member 200, 1200, whilst the back end 312 of the plunger surface 310 remains positioned at a distance from the central section 230 of the separating member 200, 1200. As a result, the chamfer of the plunger surface 310 of the plunger 300 causes the cutting plunger 300 first to cut through the first separating web 211 of the first predetermined cutting zone 210 and the second separating web 221 of the second predetermined cutting zone 220. The cutting plunger 300 then continues to cut through the third separating web 212 of the first predetermined cutting zone 210 and the fourth separating web 222 of the second predetermined cutting zone 220. The advantage is that a force necessary to cut through only two of the separating webs 211, 221, 212, 222 simultaneously is less than the force needed to cut through all four of the separating webs 211, 221, 212, 222 simultaneously. Thus the force with which the cutting plunger 300 has to be moved in the cutting direction 301 is lower due to the chamfered plunger surface 310 than would be the case with a non-chamfered plunger surface.

If the separating member 2200 in FIG. 7 is positioned in the load current path 100 of the short-circuit shutdown switch 10, then the lateral staggering of the second separating web 2221 in relation to the first separating web 2211 and the lateral staggering of the fourth separating web 2220 in relation to the third separating web 2212 causes the chamfered plunger surface 310 of the cutting plunger 300 to cut through the first separating web 2211, the second separating web 2221, the third separating web 2212 and the fourth separating web 2222 each successively during the movement of the cutting plunger 300 in the cutting direction 301. Thus in the case of separating member 2200, only one separating web 2211, 2212, 2221, 2222 is cut through at any one time. As a result, the forces needed to move the cutting plunger 300 in the cutting direction 301 are advantageously even lower when using separating member 2200.

Figure 11:
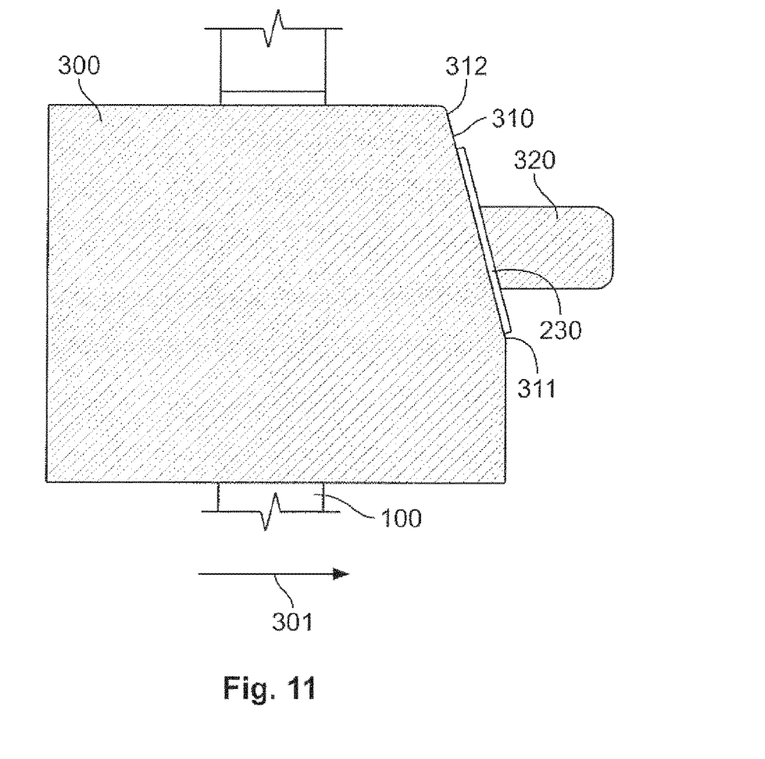
FIG. 11 is a cross-sectional view of the cutting plunger after the predetermined cutting zones of the load current path have been cut.

The embodiment of FIG. 11 shows another cross-sectional view of the cutting plunger 300 that has been moved further in the cutting direction 301 to a final position. In the final position, the cutting plunger 300 has completely cut through the first predetermined cutting zone 210 and the second predetermined cutting zone 220, so that the central section 230 of the separating member 200 has been completely separated. The load current path 100 of the short-circuit shutdown switch has thereby been broken.

The cutting plunger 300 has a pin 320, which is positioned on the plunger surface 310 of the cutting plunger 300 and extends parallel to the cutting direction 301. In the resting position of the cutting plunger 300 shown in FIGS. 8 and 9, the pin 320 is positioned in the pin receiving hole 231 of the central section 330 of the separating member 200, 1200. During the movement of the cutting plunger 300 shown in FIGS. 10 and 11 in the cutting direction 301, the pin 220 moves further into the pin receiving hole 231 of the central section 230. As a result, the cutting plunger 300 carries the central section 230 further with it even after the complete separation of the central section 230 out of the separating member 200, 1200 by cutting through the predetermined cutting zones 210, 220. Throughout the cutting process the central section 230 remains located against the plunger surface 310, as shown in the embodiment of FIG. 11. The carrying of the central section 230 by the cutting plunger 300 has the advantage that it ensures a reliable separation of the central section 230 from the remaining sections 240, 250 of the separating member 200, 1200.

Figure 12:
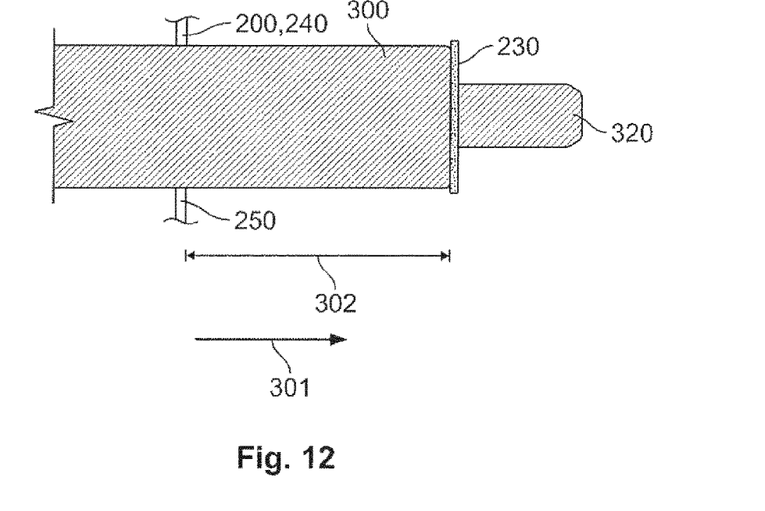
FIG. 12 is another cross-sectional view of the cutting plunger after the predetermined cutting zones of the load current path have been cut.

FIG. 12 shows another cross-sectional view of the cutting plunger 300 of the short-circuit shutdown switch 10 in the final position of the cutting plunger 300, where the cross section runs perpendicular to the cross section in the views of FIGS. 9, 10, 11 and parallel to the current flow direction 102.

As shown in FIG. 12, in the final position, the central section 230 of the separating member 200, 1200 has been separated when the predetermined cutting zones 210, 220 are cut through. Further, in the final position, the central section 230 has been displaced from the conducting tabs 240, 250 to a cutting depth 302 orientated in the cutting direction 301. Here the central section 230 is spaced by the cutting depth 302 away from the first conducting tab 240 and also by the cutting depth 302 away from the second conducting tab 250.

The positioning of two predetermined cutting zones 210, 220 in the current flow direction 102 in series causes only half of the total voltage applied via the load current path 100 to drop at each of the predetermined cutting zones 210, 220 when the predetermined cutting zones 210, 220 are cut through. As a result, the separating webs 211, 212, 221, 222 of the predetermined cutting zones 210, 220 advantageously form less pronounced arcs during the cutting process. Moreover, the complete separation of the central section 230 causes the central section 230 to be separated by the cutting depth 302 from the first conducting tab 240 and by the cutting depth 302 from the second conducting tab 250. As a result, an arc extinguishing length and a creepage gap between the first conducting tab 240 and the second conducting tab 250 of the separating member 200, 1200 also increases.

Figure 13:
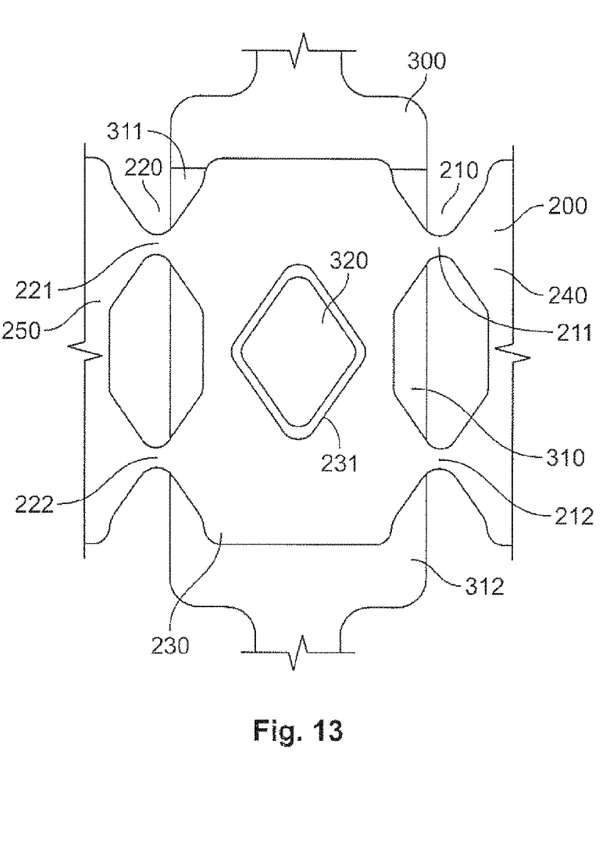
FIG. 13 is an enlarged plan view of the separating member and the cutting plunger from below.

In an embodiment of FIG. 13, the central section 230 of the separating member 200 and the plunger surface 310 of the cutting plunger 300 is shown below before the predetermined cutting zones 210, 220 of the separating member 200 are cut through by the cutting plunger 300.

The chamfered plunger surface 310 of the cutting plunger 300 is constructed as a substantially flat surface without complicated cutting contours. As a result, the cutting plunger 300 can be produced at particularly low cost.

In an embodiment, the pin 320 on the plunger surface 310 has a rhombus-shaped cross-sectional area. (See FIG. 13) The corresponding pin receiving hole 231 positioned in the central section 230 of the separating member 200 also has a rhombus-shaped cross-sectional area. The cross-sectional area of the pin receiving hole 231 is slightly larger than the cross-sectional area of the pin 320. As a result of the rhombus-shaped cross-sectional areas of the pin 320 and pin receiving hole 231, a rotational locking of the central section 230 on the plunger surface 310 of the cutting plunger 300 is achieved. Such a rotational locking can alternatively also be achieved through any other non-round cross-sectional area of the pin 320 and pin receiving hole 231. After the central section 230 has been separated by cutting through the predetermined cutting zones 210, 220, the central section 230 is carried on the plunger surface of the cutting plunger 300. The rotational locking caused by the pin 320 and the pin receiving hole 231 ensures that the separated central section 230 is not rotated during the further movement of the cutting plunger 300 in the cutting direction 301 and therefore also cannot jam inside the short-circuit shutdown switch 10. The separated central section 230 is also secured on the cutting plunger 300 in the final position of the cutting plunger 300.

Figure 14:
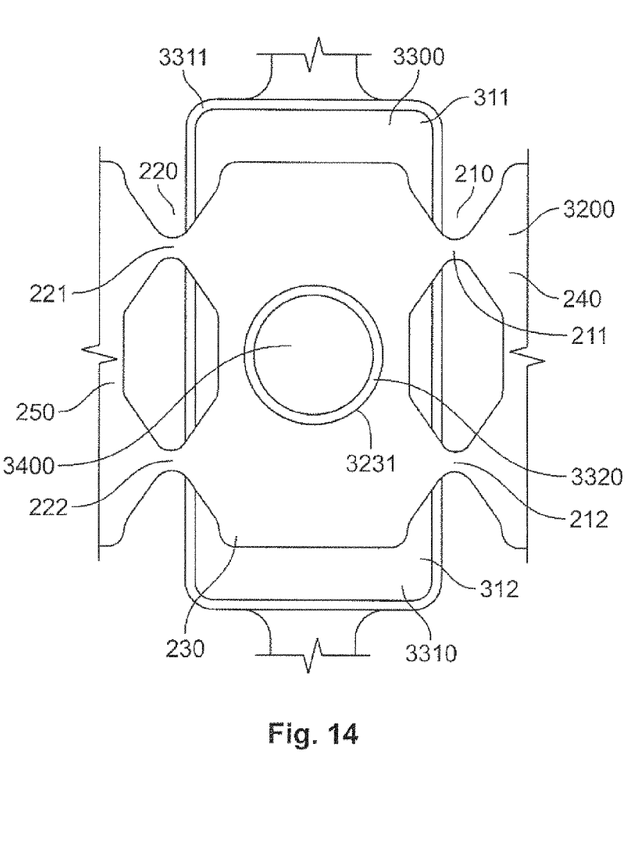
FIG. 14 is an enlarged plan view of a separating member and a cutting plunger from below.

In an embodiment of FIG. 14, a plunger surface 3310 of a cutting plunger 3300 is shown below before the predetermined cutting zones 210, 220 of the separating member 3200 are cut through by the cutting plunger 3300. The separating member 3200 and the cutting plunger 3300 have many similar elements with those of the separating member 200 and the cutting plunger 300 of FIG. 13. Similar elements are provided with the same reference numerals as in FIG. 13.

The plunger surface 3310 of the cutting plunger 3300 is likewise constructed such that it is chamfered so that a front end 311 of the plunger surface 3310 is positioned proximate to the central section 230 of the separating member 3200 than a distal back end 312 of the plunger surface 3310. The plunger surface 3310 has a circumferentially extending contoured projecting wall 3311 extending around a circumferential outer edge, which is elevated in comparison to the rest of the sections of the plunger surface 3310. Therefore, the projecting wall 3311 projects outward from the plunger surface 3310 such that in the region of the projecting wall 3311, the plunger surface 3310 of the cutting plunger 3300 is positioned nearer to the separating member 3200 than in the remaining edge sections of the plunger surface 3310. In an embodiment, the projecting wall 3311 extends around the whole of the plunger surface 3310. However, in another embodiment, projecting wall 3311 could, however, also just extend around sections of the plunger surface 3310. The projecting wall 3311 performs a carrying function and rotational locking for the central section 230 of the separating member 3200 after the separation of the central section 230 by cutting through the predetermined cutting zones 210, 220. Since the plunger surface 3310 is recessed inside the projecting wall 3311, a central section receiving space (not labelled) is formed therein, and the separated central section 230 carried in the central section receiving space with the cutting plunger 3300 by its further movement in the cutting direction 301, without rotating and jamming in the short-circuit shutdown switch 10 in the process. The separated central section 230 is also secured in the central section receiving space on the cutting plunger 3300 in the final position of the cutting plunger 3300.

Figure 18:
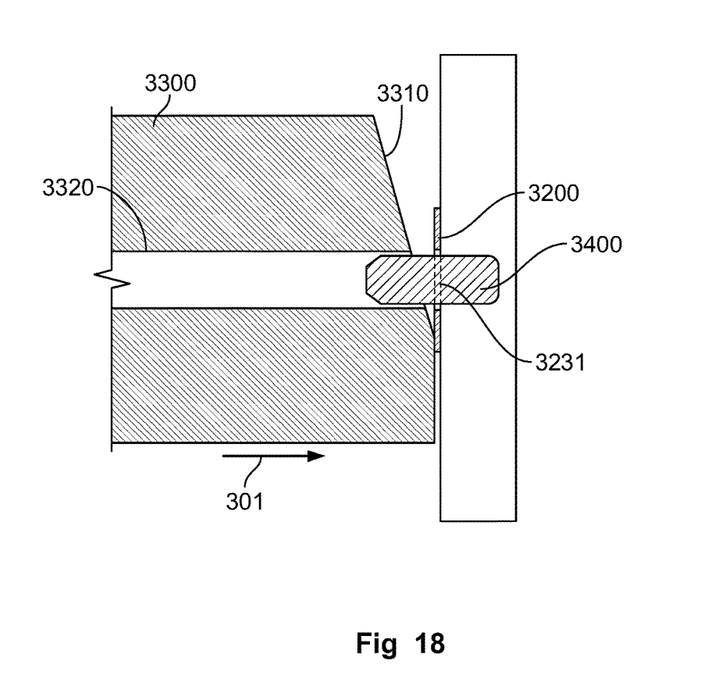
FIG. 18 is a cross-sectional view of a cutting plunger.

The central section 230 of the separating member 3200 has a substantially circular pin receiving hole 3231. The plunger surface 3310 of the cutting plunger 3300 has a pin receiving passageway 3320, shown in FIG. 18, which extends into the cutting plunger 3300 starting from the plunger surface 3310 parallel to the cutting direction 301 of the cutting plunger 3300. The pin receiving passageway 3320 is substantially circular, having a diameter approximately equal to a diameter of the pin receiving hole 3231 of the separating member 3200. The housing 400 of the short-circuit shutdown switch, as shown in the embodiments of FIGS. 14 and 18, has a pin 3400, which is firmly connected to the housing 400. The pin 3400 extends through the pin receiving hole 3231 in the central section 230 of the separating member 3200 into the pin receiving passageway 3320 of the cutting plunger 3300. The pin 3400 thereby performs a guiding function for the cutting plunger 3300, by which the cutting plunger 3300 is carried in a movement in the cutting direction 301. Moreover, the pin 3400 also ensures that the central section 230 is carried with the cutting plunger 3300 after the predetermined cutting zones 210, 220 of the separating member 3200 have been cut.

Since a rotational locking is already ensured for the central section 230 by the projecting wall 3311 of the plunger surface 3310, the pin receiving passageway 3320 and the pin receiving hole 3231, as well as the pin 3400, can each have a disc-shaped cross section. In other embodiments, the pin receiving hole 3231, the pin receiving passageway 3320 and the pin 3400 may all have complimentary non-round cross sections. Additionally, one of ordinary skill in the art would appreciate that a combination of other features of the embodiments of FIGS. 13 and 14 may also be used.

Figure 15:
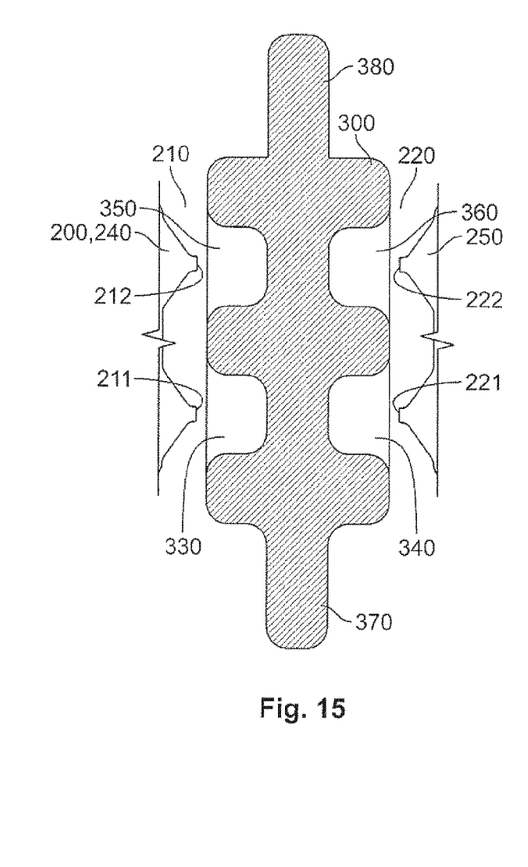
FIG. 15 is a cross-sectional view of the cutting plunger.

In an embodiment of FIG. 15, the cutting plunger 300 and the conducting tabs 240, 250 of the separating member 200 are shown after the predetermined cutting zones 210, 220 have been cut, from a perspective looking towards the cutting direction 301 of the cutting plunger 300. The outer surface of the cutting plunger 300 facing the first conducting tab 240 of the separating member 200 has a first groove 330 and a third groove 350. The outer edge of the cutting plunger 300 facing the second conducting tab 250 of the separating member 200 has a second groove 340 and a fourth groove 360. Each of the grooves 330, 340, 350, 360 is orientated parallel to the cutting direction 301 of the cutting plunger 300. The first groove 330 is positioned in the region of a portion of the first separating web 211 of the first predetermined cutting zone 310 remaining on the first conducting tab 340. The third groove 350 is positioned in the region of a portion of the third separating web 212 remaining on the first conducting tab 240. The second groove 340 is positioned in the region of a portion of the second separating web 221 remaining on the second conducting tab 250. The fourth groove 360 is positioned in the region of a portion of the fourth separating web 222 remaining on the second conducting tab 250. The grooves 330, 340, 350, 360 ensures that the portions of the separating webs 211, 212, 221, 222 remaining on the conducting tabs 240, 250 no longer engage with the cutting plunger 300 during the further movement of the cutting plunger 300 after the predetermined cutting zones 210, 220 have been cut. As such, little to no additional friction is generated. Moreover, additional air gaps are created by the grooves 330, 340, 350, 360.

The cutting plunger 300 has a longitudinal rib 370, 380 positioned on each of two opposite sides, which are orientated perpendicular to the sides having the grooves 330, 340, 350, 360. A first longitudinal rib 370 is positioned on the first side. A second longitudinal rib 380 is positioned on the second side. The longitudinal ribs 370, 380 are each orientated parallel to the cutting direction 301 of the cutting plunger 300.

Figure 16:
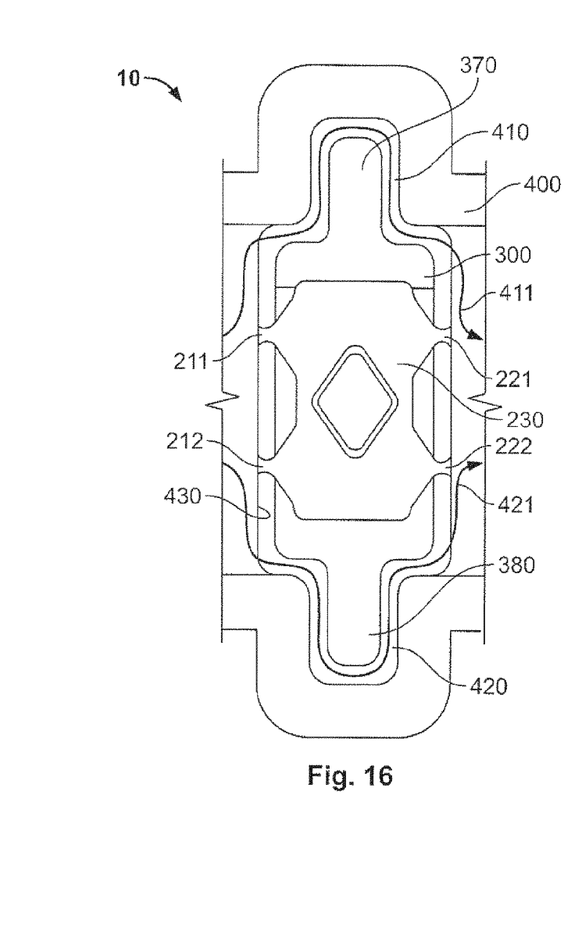
FIG. 16 is a partial cross-sectional view of the cutting plunger and part of a housing of the short-circuit shutdown switch.

In an embodiment shown in FIG. 16, the cutting plunger 300 is positioned inside the housing 400 of the short-circuit shutdown switch 10, when viewed from below. In the foreground, in front of the plunger surface 310 of the plunger 300, the central section 230 of the separating member 200 of the load current path 100 is visible. The housing 400 has a plunger receiving space 430, into which the cutting plunger 300 is inserted in the cutting direction 301 when the predetermined cutting zones 210, 220 are cut through by the cutting plunger 300.

The housing 400 also includes a first guide groove 410 and a second guide groove 420. The guide grooves 410, 420 are orientated parallel to the cutting direction 301 of the cutting plunger 300. The first guide groove 410 is complimentary to the first longitudinal rib 370 of the cutting plunger 300, the first longitudinal rib 370 being positioned in the first guide groove 410. The second guide groove 420 is complimentary to the second longitudinal rib 380 of the cutting plunger 300, the second longitudinal rib 380 being positioned in the second guide groove 420. A rotational locking of the cutting plunger 300 inside the housing 400 is brought about by the longitudinal ribs 370, 380 of the cutting plunger 300 positioned in the guide grooves 410, 420 of the housing 400. The longitudinal ribs 370, 380 positioned in the guide grooves 410, 420 guide the cutting plunger 300 when the cutting plunger 300 is displaced along the cutting direction 301.

The first longitudinal rib 370 of the cutting plunger 300 also provides an extension of a first air and creepage gap 411 between the first separating web 211 remaining on the first conducting tab 240 of the separating member 200 and the second separating web 221 remaining on the second conducting tab 250 of the separating member 200 after the first predetermined cutting zone 210 and the second predetermined cutting zone 220 have been cut through. Accordingly, the second longitudinal rib 380 brings about an extension of a second air and creepage gap 421 between the third separating web 212 remaining on the first conducting tab 240 and the fourth separating web 220 remaining on the second conducting tab 250. The gaps 411, 421 reduce the risk of an electrical arc between the first conducting tab 240 and the second conducting tab 250 of the separating member 200 after the separation of the central section 230.

In an embodiment shown in FIG. 1, the housing 400 has a switching chamber 460. The switching chamber 460 receives the cutting plunger 200. Moreover, a device to trigger and move the cutting plunger 300 in the event of a short circuit is positioned inside the switching chamber 460. This device can, for example, comprise a mechanical tensioning device having a spring element.

Furthermore in FIG. 1, a first magnet 440 and a second magnet 450 are positioned inside the housing 400. In an embodiment, the magnets 440, 450 are positioned transverse to the current flow direction 102 and to the cutting direction 301 of the cutting plunger 300. It would, however, also be possible to position the magnets 440, 450 along the cutting direction 301 of the cutting plunger 300. The magnets 440, 450 can serve to extinguish an arc occurring when the predetermined cutting zones 210, 220 of the separating member 200 are cut through. The magnets 440, 450 are optional, an in other embodiments, may be omitted.

In an embodiment, the first conducting member 110 has a first screw connection 111, and the second conducting member 120 has a second screw connection 121. In an embodiment, the screw connections 111, 121 are screw receiving holes. The short-circuit shutdown switch 100 can be inserted into an electric circuit using the screw connections 111, 121.

What is claimed is:

1. A short-circuit shutdown switch comprising:
   a load current path having
      a separating member with
         a first predetermined cutting zone;
         a second predetermined cutting zone; and
         a central section positioned between the first predetermined cutting zone and the second predetermined cutting zone having a pin receiving hole extending through the central section; and
   a cutting plunger positioned to cut the first predetermined cutting zone and the second predetermined cutting zone, the cutting plunger having a pin communicating with the pin receiving hole and extending through the pin receiving hole prior to contacting the separating member, the pin receiving hole having a cross-sectional area larger than a cross-sectional area of the pin.

2. The short-circuit shutdown switch according to claim 1, wherein the load current path further comprises a first conducting member and a second conducting member.

3. The short-circuit shutdown switch according to claim 2, wherein the separating member is positioned between the first conducting member and the second conducting member.

4. The short-circuit shutdown switch according to claim 3, wherein the first conducting member, second conducting member, and the separating member are assembled as a single component or as three separate components.

5. The short-circuit shutdown switch according to claim 3, wherein the first predetermined cutting zone has a first separating web, and the second predetermined cutting zone has a second separating web.

6. The short-circuit shutdown switch according to claim 5, wherein the first separating web and the second separating web each have a reduced width in comparison to a width of the rest of the separating member, transverse to a current flow direction.

7. The short-circuit shutdown switch according to claim 6, wherein the positions of the first separating web and the second separating web are staggered transversely to the current flow direction.

8. The short-circuit shutdown switch according to claim 4, wherein the first predetermined cutting zone has two first separating webs, and the second predetermined cutting zone has two second separating webs.

9. The short-circuit shutdown switch according to claim 3, wherein the separating member has one or more heat dissipating angled blades.

10. The short-circuit shutdown switch according to claim 1, wherein the cutting plunger is pre-stressed over a spring element in a resting position.

11. The short-circuit shutdown switch according to claim 1, wherein the cutting plunger has a chamfered plunger surface facing the central section.

12. The short-circuit shutdown switch according to claim 1, wherein the pin is complementary to the pin receiving hole.

13. The short-circuit shutdown switch according to claim 12, wherein the pin is positioned inside the pin receiving hole.

14. The short-circuit shutdown switch according to claim 1, wherein the cutting plunger has a pin receiving passageway.

15. The short-circuit shutdown switch according to claim 14, wherein the pin is positioned in the pin receiving passageway and the pin receiving hole.

16. The short-circuit shutdown switch according to claim 13, wherein the pin receiving hole and the pin each have a non-circular cross section.

17. The short-circuit shutdown switch according to claim 1, wherein the cutting plunger has a plunger surface facing the central section, the plunger surface having an edge region elevated in comparison to the rest of the plunger surface.

18. The short-circuit shutdown switch according to claim 1, wherein the cutting plunger has an outer surface with a groove extending parallel to a plunger cutting direction.

19. The short-circuit shutdown switch according to claim 1, wherein the short-circuit shutdown switch further comprises a housing.

20. The short-circuit shutdown switch according to claim 19, wherein the cutting plunger has a longitudinal rib extending parallel to a plunger cutting direction and the housing has a complementary guide groove into which the longitudinal rib is positioned.

21. The short-circuit shutdown switch according to claim 19, wherein the housing further comprises a magnet therein.

* * * * *